(No Model.)

E. CUTCLIFFE.
CULTIVATOR TOOTH.

No. 418,691. Patented Jan. 7, 1890.

Witnesses:
Fred W Skuls
Ohumal L. Ashley

Inventor:
Edward Cutcliffe

UNITED STATES PATENT OFFICE.

EDWARD CUTCLIFFE, OF EAST BETHANY, NEW YORK.

CULTIVATOR-TOOTH.

SPECIFICATION forming part of Letters Patent No. 418,691, dated January 7, 1890.

Application filed November 10, 1887. Serial No. 254,858. (No model.)

*To all whom it may concern:*

Be it known that I, EDWARD CUTCLIFFE, a citizen of the United States, residing at East Bethany, in the county of Genesee and State of New York, have invented certain new and useful Improvements in Cultivator-Teeth, of which the following is a specification.

My invention relates to improvements in cultivator-teeth for common wood-frame cultivators.

In the drawings, Figure 1 is a perspective view. Figs. 2, 3, and 4 are whole and partial views of a tooth and its socket-plate.

The tooth A is made from a square steel bar, the shank rounded to form a convex shoulder A' to fit a countersunk socket in plate D, Fig. 3. It is then given a quarter-twist at B, which brings the flat side to the front, so as to be widened out at the bottom, and then bent forward. The twist acts as a mold-board which clears itself of weeds, &c.

Figure 1:
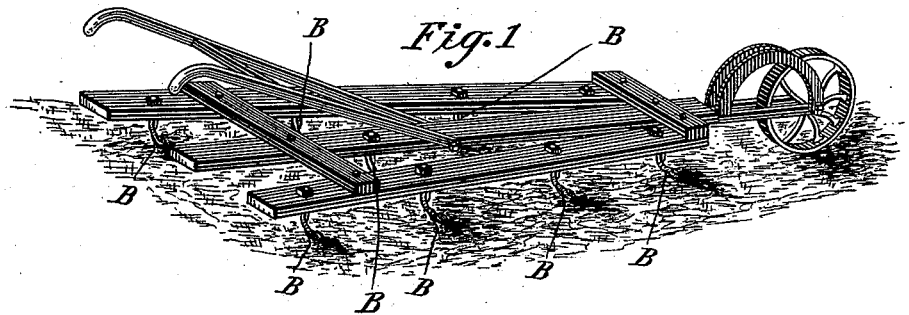
Figure 2:
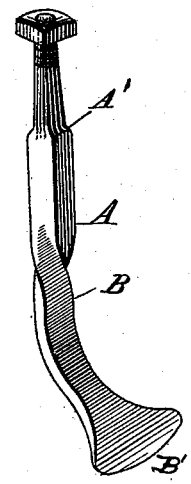
Figure 3:
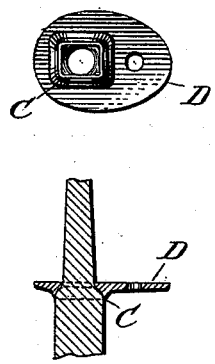
Fig. 3 is a malleable-iron shoulder-plate D with a countersunk socket C to fit the convex shoulder on the tooth. A hole is made in the plate D for the insertion of a screw, if found necessary; but the tooth, being steel, will usually stand screwing tight enough to prevent the plate turning around.
Figure 4:
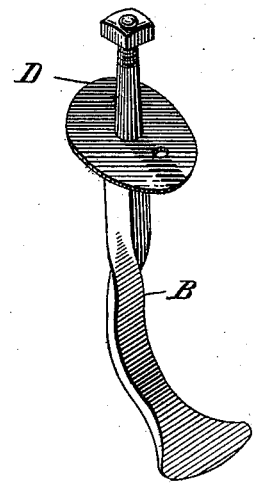
Fig. 4 shows the tooth and socket-plate complete.

Having specified my invention, what I claim as new, and desire to secure by Letters Patent of the United States, is—

The cultivator-tooth A, having the convex shoulder A', the central quarter-twist B, and the enlarged blade B' with rounded cutting-edge, in combination with the countersunk socket D and the cultivator-beam, substantially as shown and described.

EDWARD CUTCLIFFE.

Witnesses:
GEO. R. THOMAS,
P. L. ASHLEY.